United States Patent [19]

Bergstrand

[11] 4,012,945
[45] Mar. 22, 1977

[54] MEANS FOR TESTING CONTAINERS FOR LEAKAGE

[76] Inventor: Gunnar Magnus Bergstrand, Stangholmsbacken 56, Skarholmen, Sweden

[22] Filed: Sept. 24, 1975

[21] Appl. No.: 616,310

[30] Foreign Application Priority Data

Sept. 25, 1974 Sweden .............................. 7412067

[52] U.S. Cl. .................................................. 73/49.2
[51] Int. Cl.² ............................................ G01M 3/32
[58] Field of Search ............ 73/40, 49.2, 49.3, 45.4

[56] References Cited

UNITED STATES PATENTS

| 1,414,075 | 4/1922 | Dodds | 73/40 |
|---|---|---|---|
| 1,720,934 | 7/1929 | Toleik | 73/49.2 |
| 2,472,973 | 6/1949 | Hoffman et al. | 73/40 |
| 2,872,806 | 2/1959 | Mamzic | 73/49.2 UX |
| 3,028,750 | 4/1962 | Rondeau | 73/49.2 |
| R26,657 | 9/1969 | Fitzpatrick et al. | 73/40 |

*Primary Examiner*—Jerry W. Myracle
*Attorney, Agent, or Firm*—Wenderoth, Lind & Ponack

[57] ABSTRACT

A device for testing containers for leakage comprises a diaphragm box, in which a chamber is adapted to be connected to a test container or to a casing enclosing the container. At a change of the pressure the diaphragm closes a switch in an electric circuit also including a signal indicator and a timing relay which latter opens the circuit after a predetermined period of time, the signal indicator giving a signal only when the switch is closed before the relay is reversed.

6 Claims, 2 Drawing Figures

MEANS FOR TESTING CONTAINERS FOR LEAKAGE

BACKGROUND OF THE INVENTION

The invention relates to means for testing containers for leakage.

Particularly in duplicate production of some kinds of containers, such as fuel tanks and radiators for cars, a quick test of a possible leakage is highly desired. However, the testing methods hitherto used have been lengthy and time-consuming and thus not very useful for continuous operation. Thus, either the testing has been neglected, or a careful test has involved increased costs and a delay of production.

When welded or soldered canisters are subjected to an interior overpressure at the test, they are almost always marred by some leakage which in most cases, however, is negligible. Primarily, it is then a question of stipulating an upper limit for a permissible leakage. When this has been done, the test can be simplified, in that it may only be necessary to determine, if the leakage is greater than the highest permissible value.

SUMMARY OF THE INVENTION

The object of this invention is to provide means making possible a very rapid but yet, for practical purposes, sufficiently accurate leakage test of containers in timed relation to the production. In the known way, a container to be tested is, before the inspection, filled with air or another gas up to a predetermined overpressure, and then the container or a casing enclosing it is connected to one of the two chambers in a diaphragm box, the diaphragm of which, upon a change of the pressure, closes a switch in an electric circuit containing a signal indicator. The invention is characterized in that a timing relay is also included in the electric circuit. In its initial position, the relay is closed, but it may be set to open the circuit after a predetermined period of time. In this way, the signal indicator will be active only in case the switch is closed before the relay is reversed. Thus, when a container is tested for leakage, a warning signal is given, only when the leakage from the container is great enough to reverse the switch during a period of time determined by the pre-set of the relay.

The testing time may be further reduced by using an exactly controlled amount of make-up air which contributes to a more rapid increase of the pressure, and, moreover, a possible leakage from the testing apparatus may be compensated by a supply of additional air.

Brief Description of the Drawings

The invention will be further described hereinafter with reference to the accompanying drawings which show diagrammatically two preferred embodiments thereof. Thus, FIG. 1 shows a device responding to an increase of pressure in a closed casing which encloses a test container filled with gas to an overpressure, while

DETAILED DESCRIPTION OF THE INVENTION

Figure 1:
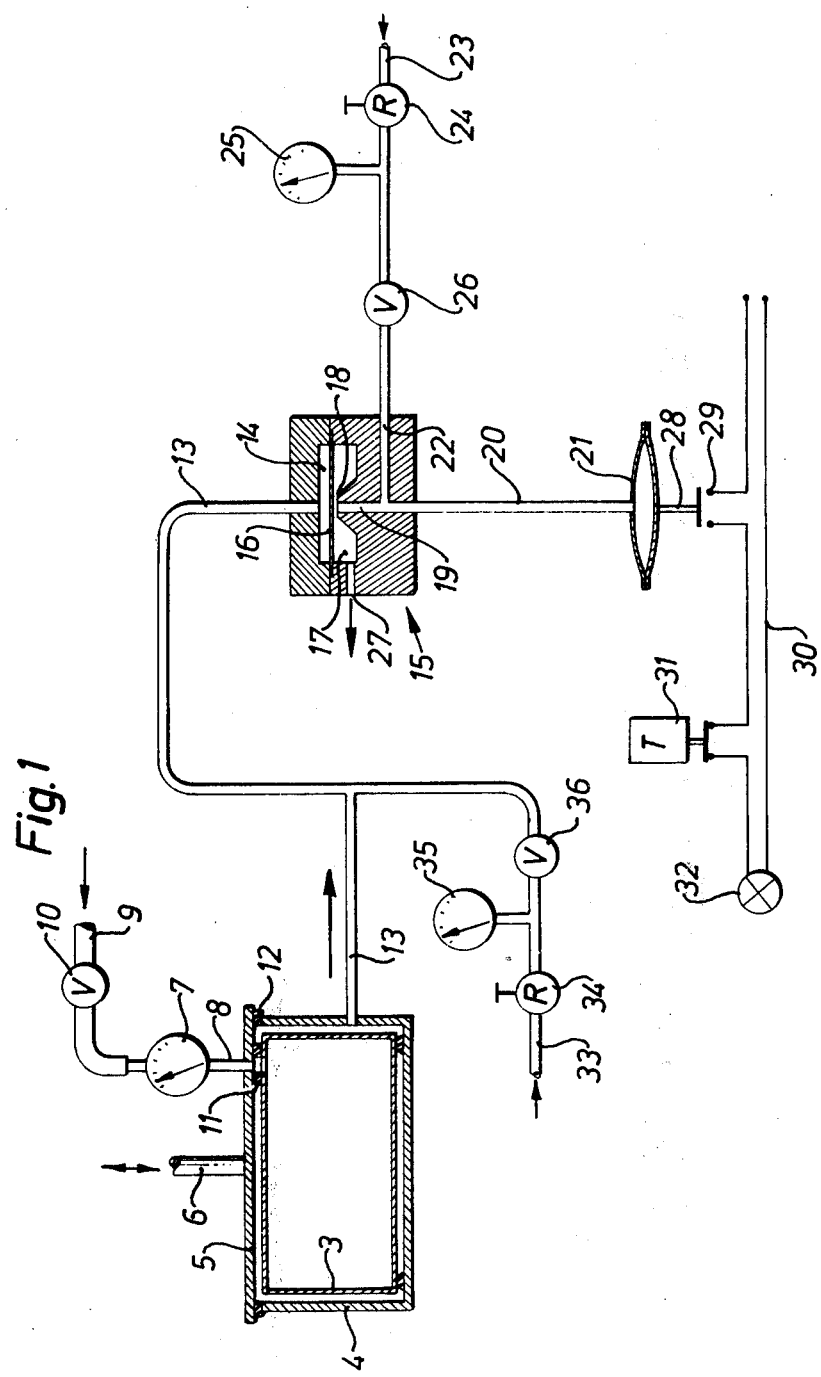

In FIG. 1, a container 3 to be tested for leakage is enclosed in a gas-proof casing 4 which is shaped and dimensioned such that a narrow but continuous space is formed around the outside of container 3. On the whole, the total volume of the interior of the test device should be as little as possible, so that a rapid increase of pressure and thus a faster result may be obtained during the test.

To facilitate the preparatory work, the casing 4 may be boxshaped and provided with a cap 5 which is secured to the lower end of a vertical piston rod 6 protruding from a compressed-air cylinder, not shown. A pipe 8 inserted through the cap 5 is connected to a manometer 7 which, in turn, is connected to a flexible compressed-air conduit 9 containing a shut-off valve 10. The end of the pipe 8 at the inside of the cap 5 is surrounded by a resilient sealing ring 11 secured to the inside of cap 5 by curing or sizing.

When the test container 3 has been immersed in the casing, where it rests on small knobs, the cap 5 is lowered and forced to sealingly engage a sealing ring 12 secured around the mouth of the casing. At the same time the sealing ring 11 on the inside of the cap is pressed onto the upper wall of the container 3, where it will sealingly surround a filling opening provided in the container wall. In this way, the filling opening may thus be connected to the conduit 9. When the cap 5 has been closed, the valve 10 is opened and the container 3 is filled with air or another gas up to a predetermined pressure which can be read on the manometer 7. The test may start when the valve 10 has again been closed. The whole preparatory work can be carried out in a few seconds.

A pipe conduit 13 extends from the casing 4 to one chamber 14 in a diaphragm box 15 which has a second chamber 17 on the opposite side of the diaphragm 16. A channel 19 through the wall of the diaphragm box 15 ends in the chamber 17, where its mouth is surrounded by an annular seat surface 18. Normally, the diaphragm 16 is held at a very little distance only from the surface 18. A pipe conduit 20 connects the other end of the channel 19 to a closed bellows 21, and a branch channel 22 from the channel 19 is connected to a compressed-air conduit 23 which contains a pressure regulating valve 24, a manometer 25 and a throttle valve 26. Moreover, the chamber 17 has an outlet channel 27 communicating with the atmosphere.

The bellows 21 is, in a known manner, composed of two bowlshaped flexible walls having their rims connected to each other. The conduit 20 is inserted axially through one of the walls, and the centre of the opposite wall is connected to one end of a short rod 28 which carries a contact member pertaining to a switch 29. The switch 29 is included in an electric circuit 30 containing a timing relay 31 and a signal lamp 32 which may be red. In the initial position shown, the switch 29 is open while the relay 31 is closed.

In the embodiment shown in FIG. 1, there is still another compressed-air conduit 33 which leads into the conduit 13 from the casing 4 to the diaphragm chamber 14, and which contains a pressure regulating valve 34, a manometer 35 and a throttle valve 36. The air conduit 33 has for its purpose to supply additional air to the conduit 13, if desired.

When the test is to be started, the valves 24 and 26 in the air conduit 23 must be open, while the valve 34 in the conduit 33 is assumed to be closed in a first performance. Thus, a quantity of air determined by adjustment of the throttle valve 26 is continuously supplied through the conduit 23 and the channel 19 to the diaphragm chamber 17, and the arrangement is such that the same volume of air escapes continuously through the outlet 27 so that atmospheric pressure is prevailing in the chamber 17. As mentioned, the test container 3 has been filled with air up to a predetermined overpressure, and therefore a leakage through the joints of the container 3 will result in an increased pressure in the casing 5. Such an increased pressure is rapidly transmitted to the diaphragm chamber 14, where it presses the diaphragm 16 onto the seat surface 18 so that the end of the channel 19 is closed. The air supplied through the conduit 23 will now expand the bellows 21 which thus closes the switch 29. If this function occurs, while the relay 31 is still closed, the lamp 32 will light to indicate a leakage. If the relay 31 has opened, before the switch is closed, the lamp remains out, which indicates that a leakage, if any, is little enough to permit approving of the container. Of course, the relay 31 is initially adjusted to open after a period of time determined with regard to the acceptable limit for the leakage.

Before the device described is used in practice, it is recommended that the device itself be tested for leakage, if any. This may be done by inserting an absolutely gas-proof container 3 in the casing 4, whereupon air is supplied through the conduit 33 at such a speed that any leakage of the device is compensated. Such a compensation may be considered as reached, when a relatively long time elapses, before the air supplied brings about the increased pressure which is necessary for depressing the diaphragm 16 onto the surface 18. To make possible a control of the amount of air supplied it may be suitable to insert a bubble tube (not shown) in the conduit 33 after the throttle valve 36, whereby a certain speed of bubbles per minute may indicate that the leakage is compensated. If desired, the volume of the bubbles may be measured, so that the flow of air may be given in $mm^3/sec.$, for instance.

It may be preferable indicate a leakage in $mm^3/sec.$ If it is assumed that the measuring device is dimensioned such that 16 $mm^3$ air must be introduced to give an output signal (a reverse of the switch 29), this will consequently mean that the time to output signal is 8 seconds, if the leakage from the container 3 is 2 $mm^3/sec.$ Moreover, it may be assumed that a leakage of 2 $mm^3/sec.$ is the highest permissible value for a certain kind of containers. The relay 31 may then be set to break the circuit 30 after 8 sec. A leakage greater than 2 $mm^3/sec.$ will, of course, cause a faster reverse of the switch 29 with the result that the lamp 32 is put on and warns of the leakage. At a leakage smaller than the permissible value, on the other hand, the relay 31 has time to be reversed, before the switch 29 is closed, so that the lamp remains dark.

Though not shown in the drawing, the relay 31 may, when it breaks the circuit, switch on another (green) signal lamp connected in another circuit and intended to show that the tested container is approved.

The time required for obtaining an output signal may be reduced essentially, if additional air is supplied through the conduit 33 to bring about a faster increase of the pressure in the chamber 14. Thus, in the example mentioned above, where the test time was 8 sec. at a permissible leakage of 2 $mm^3/sec.$, it would be possible to reduce this time to half, i.e. to 4 sec., by the supply of additional air in an amount of 2 $mm^3/sec.$ through the conduit 33. In this case, the relay 31 is thus set to break the circuit 30 after 4 seconds.

Before adjusting the volume of the additional air required for a desired shortening of the test time, the device must be calibrated with regard to its own leakage, and the volume of additional air must in addition thus be calculated to account for the amount of air which must be supplied to compensate for the constant leakage.

The numerical data mentioned above are, of course, only intended to serve as examples not limiting the invention. Thus, it may often be possible to reduce the test time by more than half, such as to ¼ or 1/5, for instance.

Figure 2:
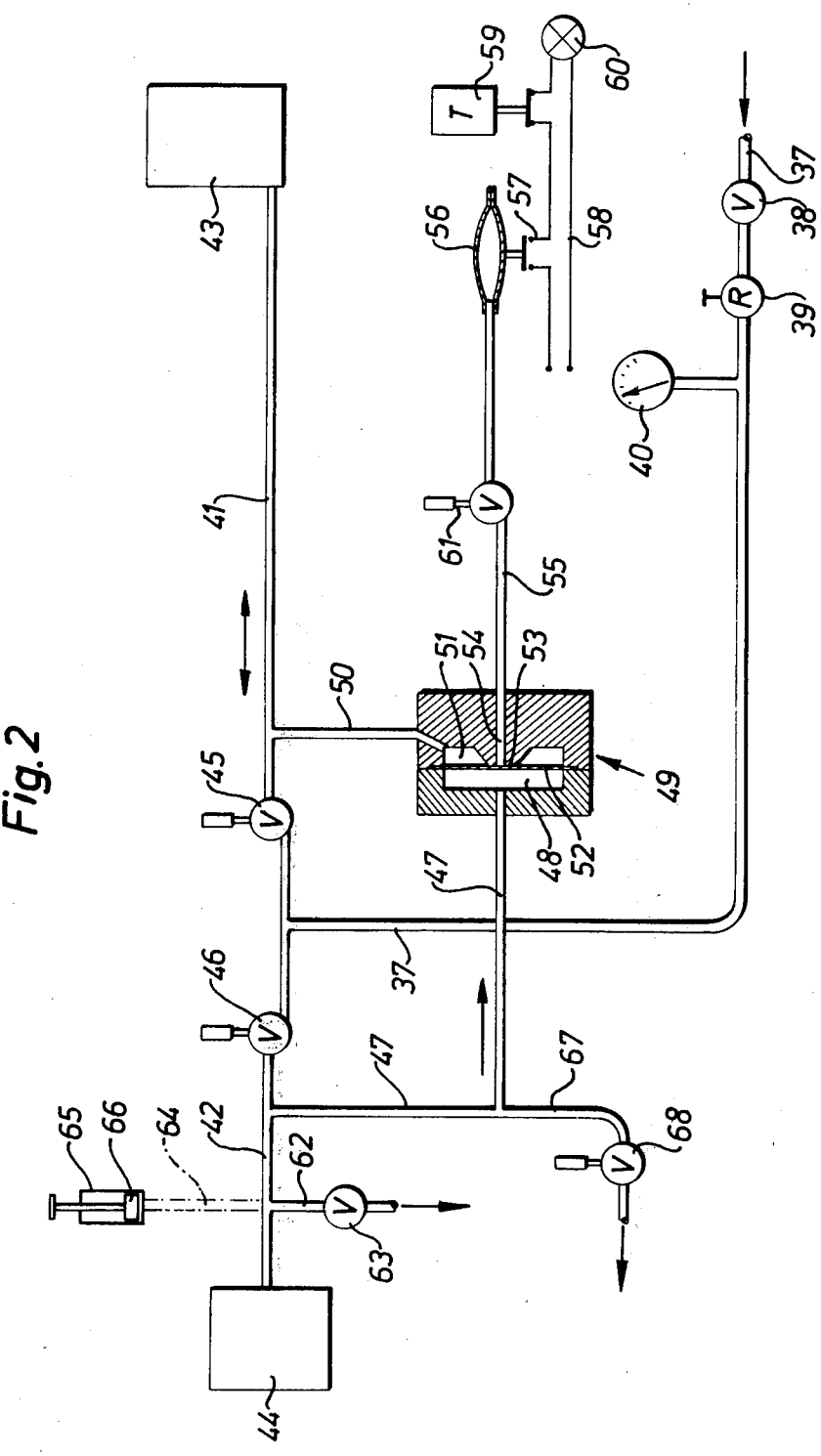
FIG. 2 shows a device responding to a decrease of pressure in a container filled with gas up to a predetermined overpressure.

The device shown in FIG. 2 is adapted to control the decrease of pressure in a leaking container which has been filled with gas up to a predetermined overpressure. A conduit 37 coming from a source of compressed air (not shown) and containing a shut-off valve 38, a pressure regulating valve 39 and a manometer 40 is, after the manometer, divided into two branches 41 and 42. One of them, the branch 41, is connected to an absolutely gas-proof comparison container 43, while the other branch 42 is connected to a container 44 to be tested. With regard to sensitivity, this device also should have as small a volume as possible, but otherwise it is here a prerequisite that the device be absolutely gas-proof, i.e. it must not have any constant leaks of its own.

Immediately after the branching point each of the two branch conduits 41,42 contains a solenoid operated shut-off valve 45 and 46, respectively. Both these valves are open at the start of the test. From a point on the conduit 42 between the valve 46 and the test container 44 a conduit 47 leads to one chamber 48 in a diaphragm box 49, and in the same way a conduit 50 leads from the branch conduit 41 to the other chamber 51 in the diaphragm box. In this case, the diaphragm 52 is arranged to normally, i.e. in the initial position, seal against an annular seat surface 53 provided in the chamber 51 around the mouth of a channel 54 which extends through the wall of the box 49. A pipe conduit 55 connects the channel 54 to a bellows 56 which has the same function as the bellows 21 in FIG. 1, i.e. one of its walls carries a contact member pertaining to a switch 57 in an electric circuit 58 which, besides, includes a normally closed timing relay 59 and a signal lamp 60. Also in this embodiment, the switch is open in the initial position, while the relay 59 is closed. It may further be noted that a solenoid operated three-way valve 61 is inserted in the conduit 55 to make possible a venting of the bellows 56 to the atmosphere, when a test has been completed.

Between the test container 44 and the branch conduit 47 the conduit 42 has another branch conduit 62 containing a valve 63 which can be pre-set in a desired throttling position. Alternatively, conduit 62 can be replaced by a conduit 64 indicated by dash dotted lines and connected to one end of a cylinder 65 containing a movable piston 66.

The branch conduit 47 ending in the diaphragm chamber 48 has, in turn, a branch conduit 67 containing a solenoid operated valve 68 which is normally closed but is opened, when the overpressure in the container 44 has to be unloaded.

When using the device shown in FIG. 2, the container 44 to be tested is thus connected to the conduit 42, whereupon the valves 38,39 in the compressed-air conduit 37 are opened to fill the test container 44 and the comparison container 43 with air up to exactly the same overpressure which can be read on the manometer 40. The diaphragm is also subjected to the same pressure on both sides, whereby it remains in its position sealing against the surface 53. The throttle valve 63 in the conduit 62 is closed. After the supply of compressed air the two solenoid valves 45 and 46 are closed simultaneously by reversing a switch, not shown. If the test container 44 leaks, the pressure drops in the diaphragm box chamber 48, and owing to the constant pressure in the opposite chamber 51 the diaphragm is then forced away from the seat surface 53. Hereby air is permitted to flow into the bellows 56 which expands and closes the switch 57 in the electric circuit 58. In the same way as in the embodiment shown in FIG. 1, the relay 59 has been pre-set to open after a period of time which is believed to correspond to an acceptable leakage. If the leakage is greater, the switch 57 will be closed before the relay 59 is opened, and the signal lamp 60 will then light. The relay 59 may be started for count-down simultaneously with the closing of the valves 45, 46 so that the same switch may be used for both operations. When the test is finished, the valves 61 and 68 are opened to unload the overpressure in the device, whereupon the test container 44 is disconnected.

When using the embodiment in FIG. 1, it was possible to reduce the test time by supply of additional air. In FIG. 2, when the leakage causes a drop of the pressure, a reduced test time may be obtained by means of an additional and adjustable pressure reduction which is thus added to the pressure drop caused by the leakage from the container 44. For that purpose, the throttle valve 63 may be opened to let out a predetermined valume of air per unit of time, and the amount of air thus discharged can be controlled by means of a bubble counter (not shown) connected to the outlet pipe 62.

If, instead, the conduit 64 including the cylinder 65 is connected to the conduit 42, the additional reduction of the pressure may be obtained by moving the piston 66 outwards in the cylinder 65 so as to increase the volume of the conduit system between the container 44 and the diaphragm chamber 48.

The embodiments described can be modified in several respects within the scope of the invention. As an example, the signal lamp can be replaced by an acoustic signal indicator. Further, the pressure reducing cylinder 65 in FIG. 2 can, instead, be used in FIG. 1 to increase the pressure in the conduit 13 from the casing 4, in which case said cylinder 65 replaces the compressed-air conduit 33 connected to the conduit 13.

What I claim is:

1. Apparatus for testing the leakage through a container wall exposed to a predetermined overpressure on one side of said container wall, said apparatus comprising:
   a diaghragm box having a diaphragm and two chambers on opposite sides of said diaphragm;
   conduit means for establishing communication between said container and a first of said chambers and for thereby causing a change of pressure in said first chamber upon leakage through said container wall;
   an electric circuit including a signal indicator, normally open switch means operable into a closed position for closing said circuit in response to a deflection of said diaphragm caused by a predetermined change of pressure in said first chamber, and timing relay means for opening said circuit after a predetermined testing time period and for preventing actuation of said signal indicator by said switch means unless said leakage through said container wall exceeds a predetermined acceptable rate; and
   pressure modifying means, adapted to be connected to said conduit means, for applying a predetermined portion of said perdetermined change of pressure to said first chamber and for thereby reducing the time necessary for deflection of said diaphragm, whereby said testing time period may be reduced.

2. Apparatus as claimed in claim 1, further comprising a closed casing enclosing said container, said container being filled with gas to said predetermined overpressure, whereby leakage from said container causes increased pressure in said casing, said conduit means being connected to said casing; and wherein said pressure modifying means comprises a first compressed gas conduit having a valve therein for supplying additional gas at a predetermined flow rate to said first chamber.

3. Apparatus as claimed in claim 2, wherein said second chamber has an outlet to the atmosphere and an inlet connected to a second compressed gas conduit controlled by a valve; and further comprising a branch conduit leading from said second compressed gas conduit, a bellows communicating with said branch conduit and connected to said switch means such that expansion of said bellows closes said switch means, said diaphragm deflecting to close said inlet upon the application of a pressure increase corresponding to said predetermined change of pressure in said first chamber, whereby said bellows communicating with said second compressed gas conduit is expanded to close said switch means.

4. Apparatus as claimed in claim 1, wherein said conduit means communicates with the container which is filled with gas to said predetermined overpressure, said container and said first chamber both being at said predetermined overpressure at commencement of a leakage test; and further comprising means for supplying said second chamber with a reference pressure equal at said commencement to said predetermined overpressure; and wherein said pressure modifying means comprises an adjustable outlet means in said conduit means for permitting a predetermined pressure drop in said first chamber.

5. Apparatus as claimed in claim 4, further comprising a compressed gas conduit divided into two branch conduits each containing a shut-off valve, a leak proof reference container connected to a first said branch conduit, a second said branch conduit being connected to the interior of said container, said conduit means being connected to said second branch conduit at a position between said shut-off valve therein and said container, said first branch conduit being connected to said second chamber, an outlet extending from said second chamber, a bellows communicating with said outlet and connected to said switch means such that expansion of said bellows closes said switch means, and said diaphragm normally closing said outlet but deflecting to open said outlet upon a pressure drop corresponding to said predetermined change of pressure in said first chamber.

6. Apparatus for detecting a change of fluid pressure in a closed space, said apparatus comprising:
   fluid pressure sensitive means for responding within a predetermined period of time to a predetermined change in fluid pressure indicative of an unacceptable rate of leakage;
   conduit means for communicating said closed space with said fluid pressure sensitive means; and
   fluid pressure modifying means for applying a controlled additional change in fluid pressure to said fluid pressure sensitive means and for thereby reducing the time necessary for response to said predetermined change in fluid pressure.

* * * * *